US009226137B2

(12) United States Patent
Anantharaman et al.

(10) Patent No.: US 9,226,137 B2
(45) Date of Patent: Dec. 29, 2015

(54) METHOD AND APPARATUS FOR REAL-TIME SHARING OF MULTIMEDIA CONTENT BETWEEN WIRELESS DEVICES

(71) Applicant: QUALCOMM Incorporated, San Diego, CA (US)

(72) Inventors: Subramanian Anantharaman, Chennai (IN); Mahesh Moorthy, Chennai (IN); Ponmudi Ramachandran, Chennai (IN); Sivakumar Ardhanari, Chennai (IN)

(73) Assignee: QUALCOMM INCORPORATED, San Diego, CA (US)

( * ) Notice: Subject to any disclaimer, the term of this patent is extended or adjusted under 35 U.S.C. 154(b) by 1 day.

(21) Appl. No.: 14/042,217

(22) Filed: Sep. 30, 2013

(65) Prior Publication Data

US 2015/0095419 A1 Apr. 2, 2015

(51) Int. Cl.
*G06F 15/16* (2006.01)
*H04W 8/24* (2009.01)
*H04L 29/08* (2006.01)
*H04W 4/00* (2009.01)
(Continued)

(52) U.S. Cl.
CPC ............ *H04W 8/24* (2013.01); *G06F 3/04883* (2013.01); *H04L 65/1069* (2013.01); *H04L 65/602* (2013.01); *H04L 67/10* (2013.01); *H04L 67/2823* (2013.01); *H04L 67/36* (2013.01); *H04N 21/43615* (2013.01); *H04N 21/4622* (2013.01); *H04W 4/008* (2013.01)

(58) Field of Classification Search
USPC .......... 709/216, 224, 228, 231, 232, 236, 248
See application file for complete search history.

(56) References Cited

U.S. PATENT DOCUMENTS 6,204,847 B1 * 3/2001 Wright .......................... 715/804
7,039,021 B1    5/2006 Kokudo
(Continued)

FOREIGN PATENT DOCUMENTS

EP          2063350 A1    5/2009
WO      2013074102 A1    5/2013

OTHER PUBLICATIONS

Desktop Sharing, EVO Documentation, Retrieved on May 3, 2013, 3 pages, <URL: http://evo.caltech.edu/evoGate/Documentation/inmeeting/tools/desktop/desktop.html >.
(Continued)

*Primary Examiner* — Michael Y Won
(74) *Attorney, Agent, or Firm* — Muncy, Geissler, Olds & Lowe, P.C.

(57) ABSTRACT

The disclosure relates to sharing real-time multimedia content. The method may include identifying an application for sharing by a first device, discovering one or more second devices by the first device, independent of a technology or a platform of the devices, applying communication protocols and creating an association between the first device and the one or more second devices, and determining multimedia capabilities of the one or more second devices. Furthermore, such an example method may include selecting at least a portion of the screen of a first device for sharing based at least on the determined multimedia capabilities of the second devices, computing application associated performance parameters based at least on a type of content and transmitting the selected portion of the screen of the first device to the one or more second devices over the wireless connection.

40 Claims, 7 Drawing Sheets

(51) Int. Cl.
*H04L 29/06* (2006.01)
*H04N 21/436* (2011.01)
*H04N 21/462* (2011.01)
*G06F 3/0488* (2013.01)

(56) References Cited

U.S. PATENT DOCUMENTS

| | | | |
|---|---|---|---|
| 7,093,021 B2* | 8/2006 | Blumenau et al. | 709/229 |
| 7,426,578 B2* | 9/2008 | Jones et al. | 709/248 |
| 8,214,489 B2* | 7/2012 | Ballette et al. | 709/224 |
| 8,219,703 B2* | 7/2012 | Sparre | 709/232 |
| 8,244,179 B2* | 8/2012 | Dua | 455/41.2 |
| 8,312,079 B2* | 11/2012 | Newsome et al. | 709/203 |
| 8,428,089 B2* | 4/2013 | Noonan et al. | 370/532 |
| 8,620,353 B1* | 12/2013 | Kahn et al. | 455/456.3 |
| 2004/0075619 A1* | 4/2004 | Hansen | 345/1.1 |
| 2006/0150109 A1* | 7/2006 | Schultz et al. | 715/759 |
| 2008/0168154 A1* | 7/2008 | Skyrm et al. | 709/218 |
| 2009/0113278 A1 | 4/2009 | Denoue et al. | |
| 2010/0064332 A1* | 3/2010 | Krikorian et al. | 725/110 |
| 2010/0153577 A1* | 6/2010 | Wohlert et al. | 709/231 |
| 2011/0106954 A1* | 5/2011 | Chatterjee et al. | 709/227 |
| 2011/0279634 A1* | 11/2011 | Periyannan et al. | 348/14.09 |
| 2012/0066722 A1* | 3/2012 | Cheung et al. | 725/62 |
| 2012/0079095 A1* | 3/2012 | Evans et al. | 709/224 |
| 2012/0185291 A1* | 7/2012 | Ramaswamy et al. | 705/7.19 |
| 2012/0233644 A1* | 9/2012 | Rao | 725/62 |
| 2012/0284343 A1* | 11/2012 | Lee et al. | 709/206 |
| 2012/0317487 A1* | 12/2012 | Lieb et al. | 715/730 |
| 2013/0031590 A1* | 1/2013 | Ivanov et al. | 725/110 |
| 2013/0046852 A1 | 2/2013 | Saxena et al. | |
| 2013/0138736 A1* | 5/2013 | Wang et al. | 709/204 |
| 2013/0148720 A1* | 6/2013 | Rabii | 375/240.12 |
| 2013/0335316 A1* | 12/2013 | Smith et al. | 345/156 |
| 2014/0059217 A1* | 2/2014 | Pizurica | 709/224 |
| 2014/0089416 A1* | 3/2014 | Wang | 709/205 |
| 2014/0108568 A1* | 4/2014 | Lee | 709/206 |
| 2014/0122737 A1* | 5/2014 | Silberstein et al. | 709/231 |
| 2014/0123237 A1* | 5/2014 | Gaudet et al. | 726/4 |
| 2014/0137202 A1* | 5/2014 | Huang et al. | 726/4 |
| 2014/0149859 A1* | 5/2014 | Van Dyken et al. | 715/702 |
| 2014/0187162 A1* | 7/2014 | Mei | 455/41.2 |
| 2014/0258405 A1* | 9/2014 | Perkin | 709/204 |
| 2014/0310348 A1* | 10/2014 | Keskitalo et al. | 709/204 |
| 2014/0310702 A1* | 10/2014 | Ricci et al. | 717/173 |
| 2014/0351354 A1* | 11/2014 | Chandra et al. | 709/206 |
| 2015/0020136 A1* | 1/2015 | Wang et al. | 725/116 |
| 2015/0065056 A1* | 3/2015 | Won et al. | 455/41.3 |

OTHER PUBLICATIONS

Livestream, Creating and Managing Events, Retrieved on May 3, 2013, 12 pages, <URL: http://help.livestream.com/customer/portal/articles/467168-creating-and-managing-events >.
SPLASHTOP Inc., "Splashtop 2—Remote Desktop for iPad on the iTunes App Store," Retrieved on May 3, 2013, 3 pages, <URL: https://itunes.apple.com/us/app/splashtop-2-remote-desktop/id382509315?mt=8 >.
International Search Report and Written Opinion—PCT/CN2014/057736—ISA/EPO—Dec. 19, 2014.

* cited by examiner

| Content Source | Content Type | Content Destination | Mode of Operation |
|---|---|---|---|
| Tablet | Multi-Player Game | Tablet & TV Console | Wi-Fi-Direct<br>Complete Screen Sharing with Controls |
| WiFi TV | Sports on TV | Kitchen (IOE) Microwave | WLAN / IOE<br>Snippet of Source displayed on IOE-enabled appliance |
| WiFi TV | Finance News | Connected Device / Phones | Cellular<br>Snippet displayed on Car-Dash<br>SMS-ed to Mobile |

METHOD AND APPARATUS FOR REAL-TIME SHARING OF MULTIMEDIA CONTENT BETWEEN WIRELESS DEVICES

BACKGROUND

Aspects of the present disclosure relate generally to sharing of content between wireless devices, more particularly, to a method and an apparatus for real-time sharing of multimedia content between wireless devices.

With significant increase in the number of end-user wireless devices, for example, mobile phones, tablets, gaming consoles, home appliances with wireless capabilities, the need for selective sharing of multimedia content between these devices in real-time is also increasing. For example, when a user of a mobile phone or a tablet wants to share the screen contents of the mobile phone or the tablet with other wireless devices in real-time, no technology-independent solution is currently available.

As such, a technology-independent solution for real-time sharing of multimedia content between wireless devices may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes an example method and apparatus for real-time sharing of multimedia content between wireless devices. In an aspect, a method for real-time sharing of multimedia content between wireless devices is disclosed. The method may include identifying an application for sharing by a first device, discovering one or more second devices by the first device, wherein the discovering of the one or more second devices by the first device is independent of a technology or a platform of the one or more second devices, applying communication protocols for communicating with the one or more second devices and creating an association between the first device and the one or more second devices, determining multimedia capabilities of the one or more second devices, selecting at least a portion of a screen of a first device for sharing with the one or more second devices based at least on the determined multimedia capabilities of the one or more second devices, computing application associated performance parameters by the first device, wherein the performance parameters are computed by the first device based at least on a type of content identified for sharing by the application on the first device and the determined multimedia capabilities of the one or more second devices, and transmitting the selected portion of the screen of the first device to the one or more second devices over the wireless connection.

In an additional aspect, an apparatus for real-time sharing of multimedia content between wireless devices is described. The apparatus may include means for identifying an application for sharing by a first device, means for discovering one or more second devices by the first device, wherein the discovering of the one or more second devices by the first device is independent of a technology or a platform of the one or more second devices, means for applying communication protocols for communicating with the one or more second devices and creating an association between the first device and the one or more second devices, means for determining multimedia capabilities of the one or more second devices, means for selecting at least a portion of a screen of a first device for sharing with the one or more second devices based at least on the determined multimedia capabilities of the one or more second devices, means for computing application associated performance parameters by the first device, wherein the performance parameters are computed by the first device based at least on a type of content identified for sharing by the application on the first device and the determined multimedia capabilities of the one or more second devices, and means for transmitting the selected portion of the screen of the first device to the one or more second devices over the wireless connection.

Moreover, the present disclosure presents a computer program product for sharing multimedia content between wireless devices in real-time over a wireless connection. The computer program product may include a computer-readable medium comprising code executable by a computer for identifying an application for sharing by a first device, discovering one or more second devices by the first device, wherein the discovering of the one or more second devices by the first device is independent of a technology or a platform of the one or more second devices, applying communication protocols for communicating with the one or more second devices and creating an association between the first device and the one or more second devices, determining multimedia capabilities of the one or more second devices, selecting at least a portion of a screen of a first device for sharing with the one or more second devices based at least on the determined multimedia capabilities of the one or more second devices, computing application associated performance parameters by the first device, wherein the performance parameters are computed by the first device based at least on a type of content identified for sharing by the application on the first device and the determined multimedia capabilities of the one or more second devices, and transmitting the selected portion of the screen of the first device to the one or more second devices over the wireless connection.

In a further aspect, an apparatus for sharing multimedia content between wireless devices in real-time over a wireless connection is described. The apparatus may include a an application identifying component for identifying an application for sharing by a first device, a device discovering component for discovering one or more second devices by the first device, wherein the discovering of the one or more second devices by the first device is independent of a technology or a platform of the one or more second devices, a communication protocol component for applying communication protocols for communicating with the one or more second devices and creating an association between the first device and the one or more second devices, a multimedia capability determining component for determining multimedia capabilities of the one or more second devices, a content selection component for selecting at least a portion of a screen of a first device for sharing with the one or more second devices based at least on the determined multimedia capabilities of the one or more second devices, an application performance component for computing application associated performance parameters by the first device, wherein the performance parameters are computed by the first device based at least on a type of content identified for sharing by the application on the first device and the determined multimedia capabilities of the one or more second devices, and a content transmitting component for transmitting the selected portion of the screen of the first device to the one or more second devices over the wireless connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and apparatuses for sharing multimedia content between wireless devices in real-time over a wireless connection that may include identifying an application for sharing by a first device, discovering one or more second devices by the first device, wherein the discovering of the one or more second devices by the first device is independent of a technology or a platform of the one or more second devices, applying communication protocols for communicating with the one or more second devices and creating an association between the first device and the one or more second devices, determining multimedia capabilities of the one or more second devices, selecting at least a portion of a screen of a first device for sharing with the one or more second devices based at least on the determined multimedia capabilities of the one or more second devices, computing application associated performance parameters by the first device, wherein the performance parameters are computed by the first device based at least on a type of content identified for sharing by the application on the first device and the determined multimedia capabilities of the one or more second devices, and transmitting the selected portion of the screen of the first device to the one or more second devices over the wireless connection.

Figure 1:
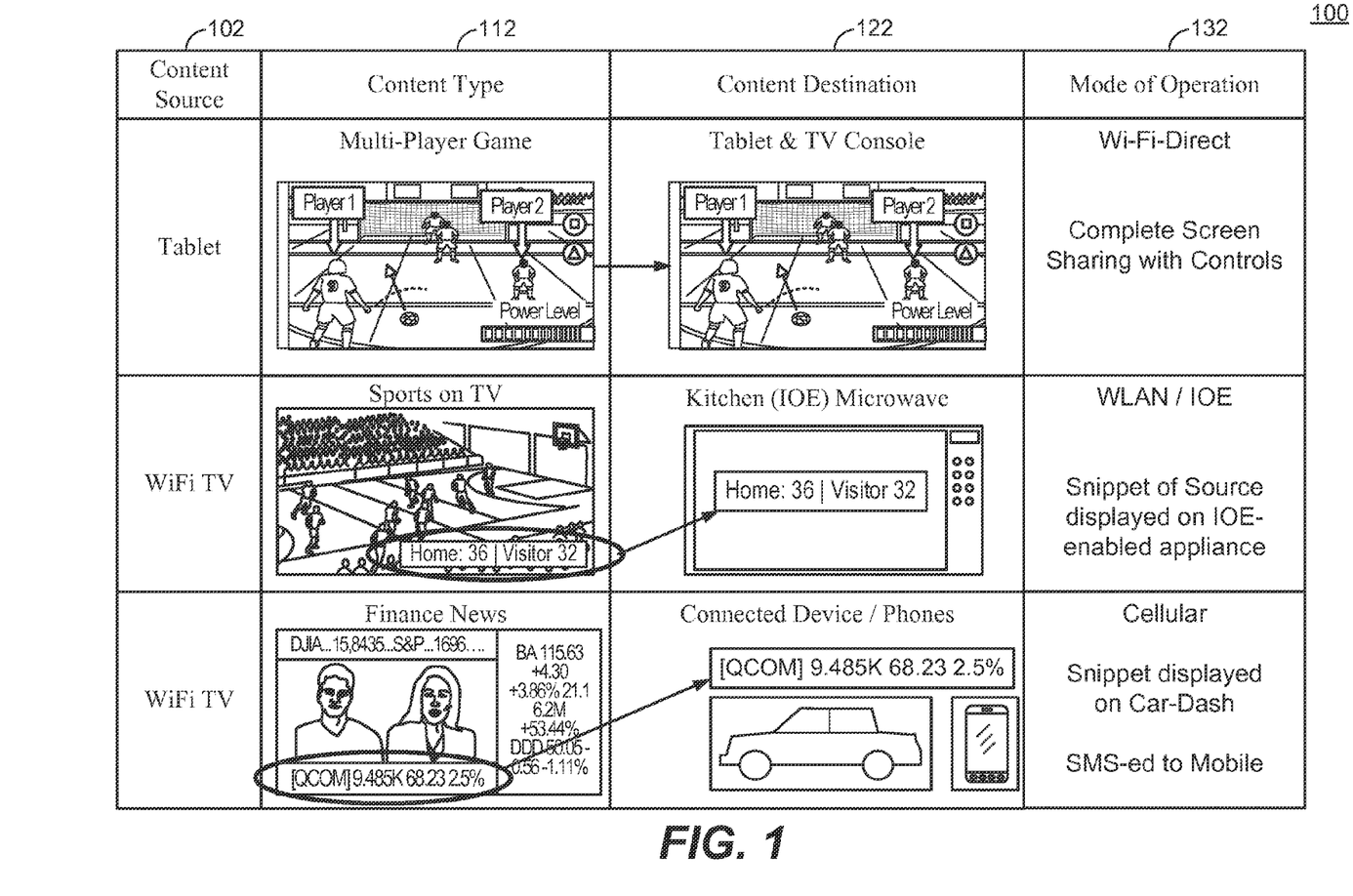
FIG. 1 is a block diagram of an aspect of a system for sharing multimedia content between wireless devices in real-time over a wireless connection.

Referring to FIG. 1, a system 100 is illustrated for real-time sharing of multimedia content between wireless devices. In an aspect, for example, system 100 may include one or more content sources 102, content types 112, content destinations 122, and modes of operation 132.

For example, in an aspect, content sources 102 may include wireless devices, e.g., a tablet, Wi-Fi TV, a mobile station (MS), a user equipment (UE), etc. Content type 112 may include a multi-player game (e.g., multi-player video games), sports programming, news, etc. Content destinations 122 may include may include wireless devices (e.g., a tablet, a Wi-Fi TV, a UE, etc.), kitchen appliances (e.g., microwaves, ovens, refrigerators, etc.), automobile dash boards, etc. Modes of operation 132 may be types of wireless communication that may be used for sharing multimedia content between wireless devices in real-time, e.g., Wi-Fi/WLAN, Cellular, Near Field Communications, Satellite communications, etc. In an aspect, the content destination may include thin clients, e.g., a low-end computer terminal which may only provide a graphical user interface to the end user. (which could be used as a viewing shared content from the primary device)

In an example aspect, a user of a content source (also called as a host or a primary device), may select a portion of the screen of a wireless device, for example, a UE, to be shared with other devices (also be called as guest or secondary devices). In an aspect, for example, the user may select the content to share by selecting a set of screen co-ordinates with a marking/pointing device or gestures. The selected set of screen co-ordinates may be converted into a set of co-ordinates and boundaries using any mechanism known in the art. The contents of the screen within the boundaries are then selected for sharing with other wireless devices.

In an additional aspect, the selected area may include one or more types of content, for example, video, scrolling news ticker, video games, weather, sports, hi-definition video, etc. In an aspect, the sharing of the content may occur in real-time or near real-time due to latency/delay associated with wireless communications.

In an aspect, the selected content may be streamed or snipped and transmitted to guest devices or secondary devices, for example, a tablet, Wi-Fi TV, user equipment (UE), kitchen appliances (e.g., microwaves, ovens, refrigerators), automobile dash boards, etc.

In an aspect, a multimedia content manager explained in detail below in reference to FIG. 2 may be configured for sharing multimedia content between wireless devices in real-time over a wireless connection.

Figure 2:
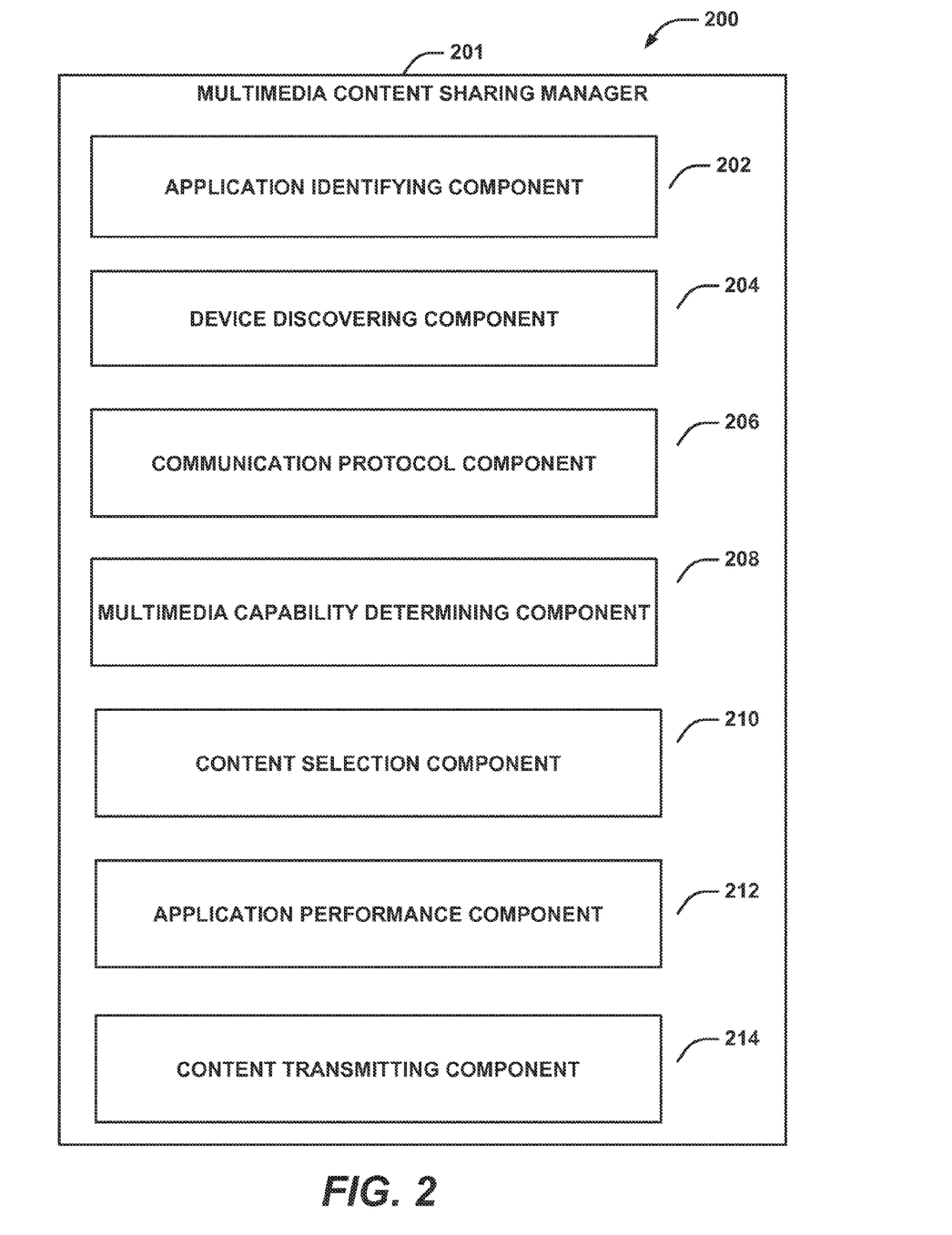
FIG. 2 is a block diagram of an aspect of a multimedia content sharing manager of the present disclosure.

FIG. 2 illustrates an aspect of a multimedia content sharing manager that may be configured for sharing multimedia content between wireless devices in real-time over a wireless connection. In an aspect, for example, multimedia content sharing manager 201 may be configured for sharing multimedia content between wireless devices in real-time over a wireless connection.

Multimedia content sharing manager 201 may be configured to include one or more of an application identifying component 202, a device discovering component 204, a communication protocol component 206, a multimedia capability determining component 208, a content selection component 210, an application performance component 212, and/or a content transmitting content 214.

In an aspect, application identifying component 202 may be configured to identify an application for sharing by a first device. For example, application identifying component 202 may be configured to identify an application by the host/primary device. Application identifying component 202 allows a user of the host/primary device to identify the application running on the UE or the tablet for sharing by the host/primary device. For example, the application may be a streaming video or a multi-player video game.

In an aspect, device discovering component 204 may be configured to discover one or more second devices by the first device, wherein the discovering of the one or more second devices by the first device is independent of a technology or a platform of the one or more second devices or based on proximity to the primary device. In an aspect, the first device is the host device and the one or more second devices are the guest device. For example, in an aspect, device discovering component 204 may discover other devices to share the application identified for sharing by application identifying component 202. In an aspect, for example, the discovering of other devices may be performed by the host device by scanning the local wireless environment, e.g., WiFi environment of the host device, for any wireless devices present in the surrounding WiFi environment. In an additional or optional aspect, device discovering component 204 may discover devices for sharing based on input from the user. For example, the user of the host device may identify devices to share the application by inputting contact information of the secondary/guest devices, e.g., device names, phone numbers, and/or email addresses. In an additional or optional aspect, device discovering component 204 may be configured to discover devices over a wireless network, for example, LTE network. For example, in an aspect, a Wi-Fi TV may be configured as a primary device and a vehicle dashboard connected to a LTE network via a on-board mobile device may be configured as a secondary device. In an additional or optional aspect, information about the secondary devices, for example, a vehicle dashboard may be pre-configured at the host device.

In an aspect, communication protocol component 206 may be configured to apply communication protocols for communicating with the one or more second devices and creating an association between the first device and the one or more second devices. For example, in an aspect, communication protocol component 206 may apply communication protocols for sharing content with other wireless devices identified by the host device as the protocols required for communication may be dependent on the type of content to be shared and/or type of device with the which the content is shared, and/or the type of wireless connection over which the content is shared.

In an aspect, multimedia capability determining component 208 may be configured to determine multimedia capabilities of the one or more second devices. For example, in an aspect, multimedia capability determining component 208 may determine the multimedia capabilities of the discovered devices, e.g., whether a discovered device (secondary device) supports streaming video, text-based information such as a stock prices or scores of sporting activities, etc. In an example aspect, multimedia capability determining component 208 may determine that a secondary device supports streaming video or that a second device supports only text based snippets, e.g., stock ticker information on a vehicle dash board.

In an aspect, content selection component 210 may be configured to select at least a portion of a screen of a first device for sharing with the one or more second devices based at least on the determined multimedia capabilities of the one or more second devices. For example, in an aspect, content selection component 210 may be configured to select the content to be shared by the first device, e.g., entire screen of the host device or a portion of the screen of the host device. In an additional aspect, for example, content selection component 210 may be configured to allow a user of the primary device set or configure access levels for each of the one or more secondary devices.

In an example aspect, a user of a host/primary device may select a portion of the screen of the primary device to be shared with guest/secondary devices. In an aspect, for example, the user may select the content to share by selecting a set of screen co-ordinates with a marking/pointing device or gestures. The selected set of screen co-ordinates may be converted into a set of co-ordinates and boundaries using any mechanism known in the art. The contents of the screen within the boundaries are then selected for sharing with other devices.

In an aspect, application performance component 212 may be configured to compute application associated performance parameters by the first device, wherein the performance parameters are computed by the first device based at least on a type of content identified for sharing by the application on the first device and the determined multimedia capabilities of the one or more second devices. For example, in an aspect, application performance component 212 may compute performance parameters required for sharing the identified application and/or the selected content. For example, a multi-player gaming session may require relatively more assured performance and less latency when compared to snipping a scrolling stock ticker and transmitting over a wireless connection to guest/secondary devices.

In an additional aspect, application performance component 212 may compute quality of service (QoS) parameters required for sharing the content selected by the host device. In an optional aspect, application performance component 212 may be configured to dynamically update required QoS parameters based on changes in the type of content being shared by the host/primary device. For example, a user of a host device may initially share a web browser with static content (e.g., text) and later may start streaming a video. In such a scenario, application performance component 212 may be configured to dynamically update QoS requirements.

In an additional aspect, application performance component 212 may be configured to dynamically determine the optimum kind of wireless connection available. For example, in an aspect, if a WiFi and a cellular connection are available, and the available bandwidth of the WiFi connection is higher the available bandwidth of the cellular connection, application performance component 212 may select the WiFi connection for sharing multimedia content between the wireless devices.

In an aspect, content transmitting component 214 may be configured to transmit the selected portion of the screen of the first device to the one or more second devices over the wireless connection. For example, in an aspect, content transmitting component 213 may transmit the content identified for sharing by the host device to the guest devices.

In an aspect, a database of past associations of a primary device with a set of secondary devices, for example, identified by Media Access Control (MAC) addresses, phone numbers and/or email addresses may be stored in the multimedia content sharing manager 201. Additionally, metadata regarding the frequently used applications may be linked with the secondary devices the applications were shared with to assist the primary device in predicting the type of QoS that may be required when sharing the multimedia content in real-time. In an optional aspect, a list of trusted secondary devices may be stored in the multimedia content sharing manager 201. In an additional aspect, associations between primary and secondary devices may be pre-configured by users of primary devices.

In an aspect, multimedia content sharing manager 201 may be configured to allow secondary devices access a primary device once the primary device initiates sharing of content with the secondary device. For example, in an aspect, a primary device may initiate a screen share with text (e.g., tablet-to-tablet) which may allow the secondary device access to the primary device.

In an additional aspect, multimedia content sharing manager 201 may be configured to modify access permissions of the guest or the secondary devices. For example, the host or the primary devices may determine which secondary devices can share the content received from the host or the primary device with other devices. In an optional aspect, the host/primary device may allow a secondary device to become the primary device to share multimedia content with the host/primary device and other devices. In a further additional aspect, the primary device may control if the content shared with the secondary devices may be recorded by the secondary devices to allow control over the content and to avoid unauthorized approval of the content shared by the primary device.

Figure 3:
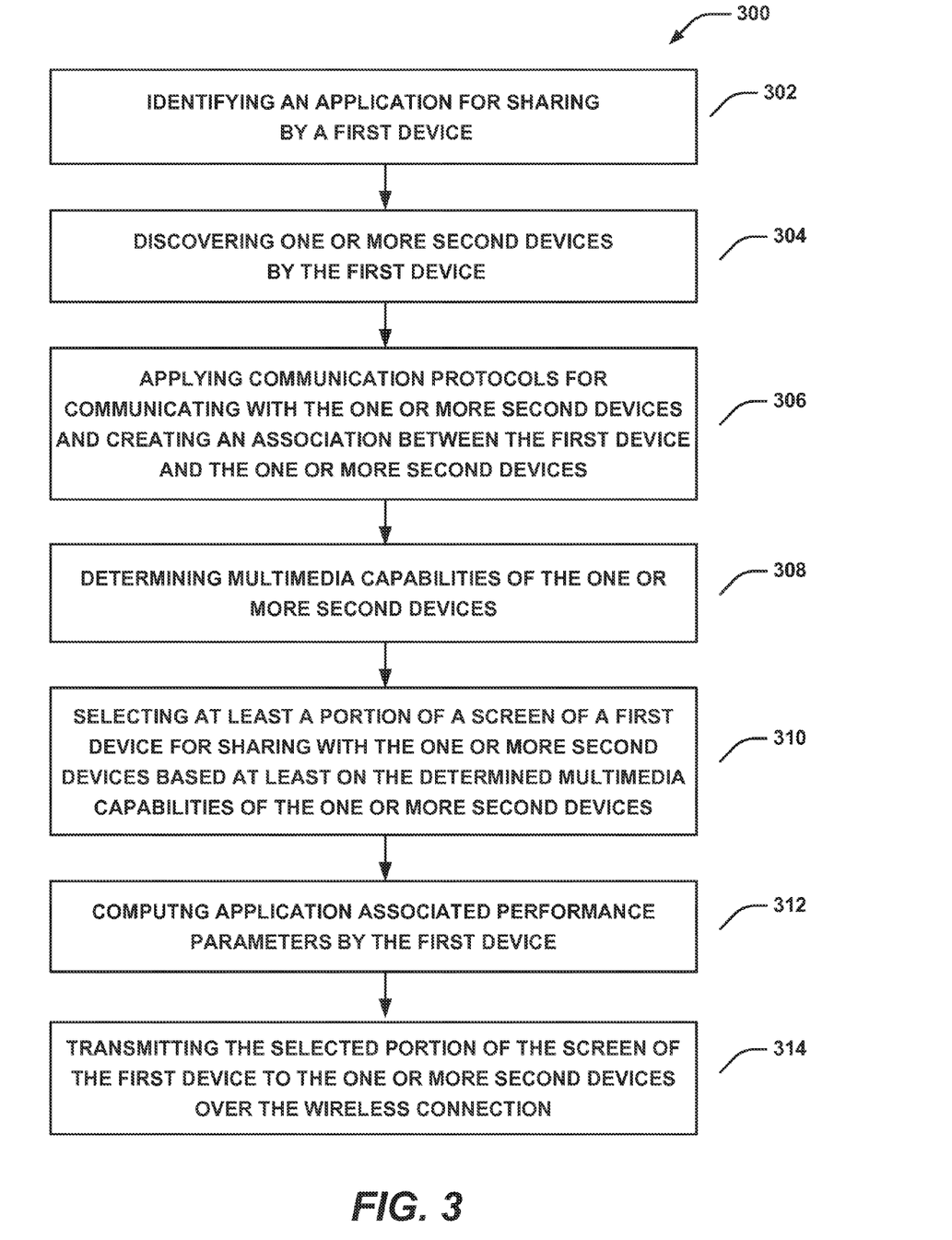
FIG. 3 is a flow diagram illustrating aspects of a method for sharing multimedia content between wireless devices in real-time over a wireless connection.

FIG. 3 illustrates an example methodology 300 for sharing multimedia content in real-time over a wireless connection.

In an aspect, at block 302, methodology 300 may include identifying an application for sharing by a first device. For example, in an aspect, multimedia content sharing manager 201 and/or application identifying component 302 may identify an application for sharing by a device.

At block 304, methodology 300 may include discovering one or more second devices by the first device, wherein the discovering of the one or more second devices by the first device is independent of a technology or a platform of the one or more second devices. For example, in an aspect, multimedia content sharing manager 201 and/or device discovering component 204 may discover one or more second devices by the first device, wherein the discovering of the one or more second devices by the first device is independent of a technology or a platform of the one or more second devices.

At block 306, methodology 300 may include applying communication protocols for communicating with the one or more second devices and creating an association between the first device and the one or more second devices. For example, in an aspect, multimedia content sharing manager 201 and/or communication protocol component 206 may apply communication protocols for communicating with the one or more second devices and creating an association between the first device and the one or more second devices.

At block 308, methodology 300 may include determining multimedia capabilities of the one or more second devices. For example, in an aspect, multimedia content sharing manager 201 and/or multimedia capabilities determining component 208 may determine multimedia capabilities of the one or more second devices.

At block 310, methodology 300 may include selecting at least a portion of a screen of a first device for sharing with the one or more second devices based at least on the determined multimedia capabilities of the one or more second devices. For example, in an aspect, multimedia content sharing manager 201 and/or content selection component 210 may select at least a portion of a screen of a first device for sharing with the one or more second devices based at least on the determined multimedia capabilities of the one or more second devices.

At block 312, methodology 300 may include computing application associated performance parameters by the first device, wherein the performance parameters are computed by the first device based at least on a type of content identified for sharing by the application on the first device and the determined multimedia capabilities of the one or more second devices. For example, in an aspect, multimedia content sharing manager 201 and/or application performance component 212 may compute application associated performance parameters by the first device, wherein the performance parameters are computed by the first device based at least on a type of content identified for sharing by the application on the first device and the determined multimedia capabilities of the one or more second devices.

At block 314, methodology 300 may include transmitting the selected portion of the screen of the first device to the one or more second devices over the wireless connection. For example, in an aspect, multimedia content sharing manager 201 and/or content transmitting content 214 may transmit the selected portion of the screen of the first device to the one or more second devices over the wireless connection.

The methodology 300 is shown and described as a series of acts, it is to be understood and appreciated that the methodologies are not limited by the order of acts, as some acts may, in accordance with one or more aspects, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more aspects.

Figure 4:
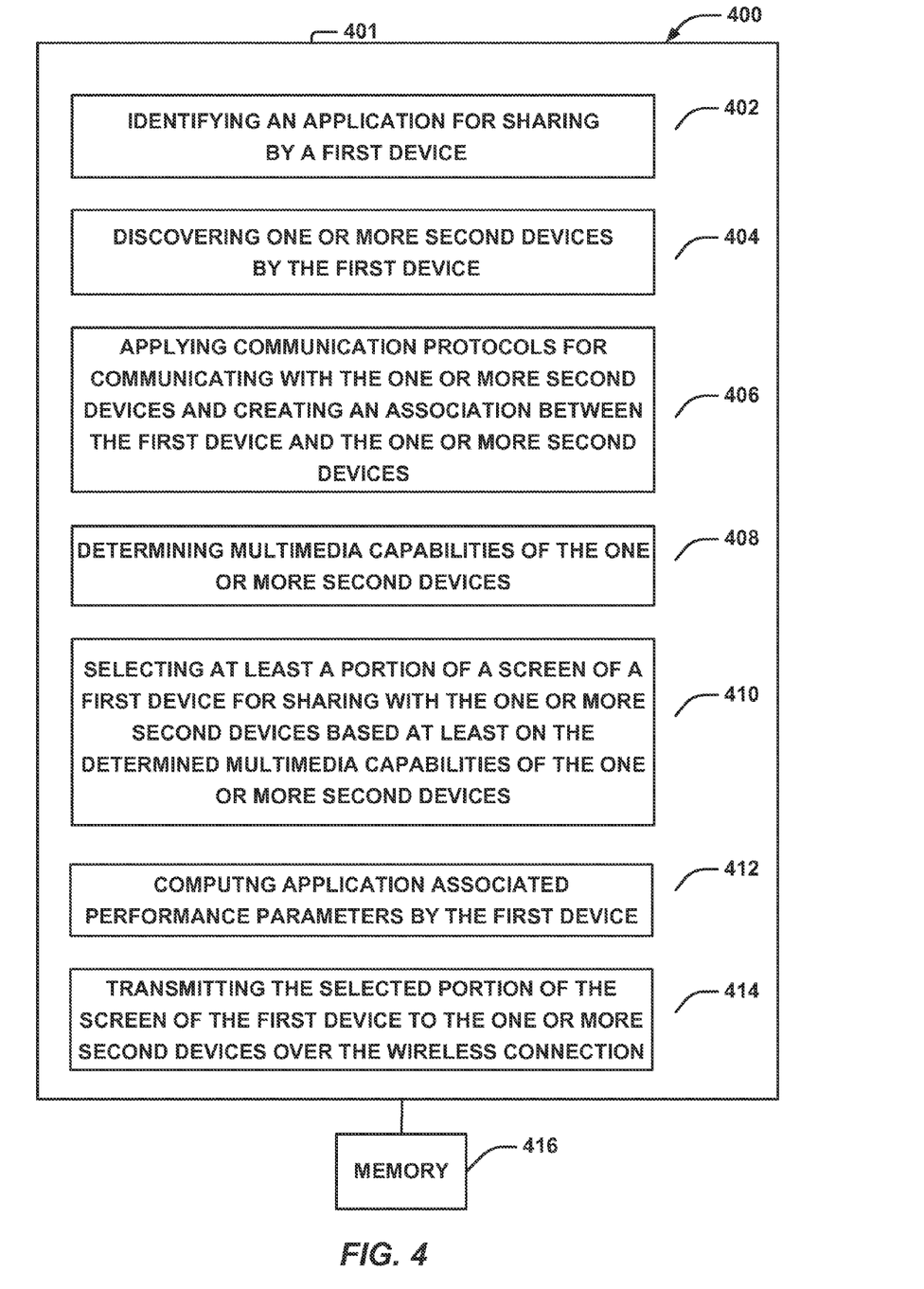
FIG. 4 is a block diagram illustrating aspects of a logical grouping of electrical components for sharing multimedia content between wireless devices in real-time over a wireless connection.

Referring to FIG. 4, an example system 400 is displayed for sharing multimedia content between wireless devices in real-time over a wireless connection.

For example, system 400 may reside partially within multimedia content sharing manager 201 (FIG. 2). It is to be appreciated that system 400 is represented as including functional blocks, which can be functional blocks that represent functions implemented by a processor, software, or a combination thereof (for example, firmware).

System 400 includes a logical grouping 401 of electrical components that can act in conjunction. For instance, logical grouping 401 may include an electrical component 402 for identifying an application for sharing by a first device. In an aspect, for example, electrical component 402 may comprise application identifying component 202 (FIG. 2).

Additionally, logical grouping 401 may include an electrical component 404 for discovering one or more second devices by the first device, wherein the discovering of the one or more second devices by the first device is independent of a technology or a platform of the one or more second devices. In an aspect, for example, electrical component 404 may comprise device discovering component 204.

Further, logical grouping 401 may include an electrical component 406 for applying communication protocols for communicating with the one or more second devices and creating an association between the first device and the one or more second devices. In an aspect, for example, electrical component 406 may comprise communication protocol component 206.

Furthermore, logical grouping 401 may include an electrical component 408 for determining multimedia capabilities of the one or more second devices. In an aspect, for example, electrical component 408 may comprise multimedia capabilities determining component 208.

In addition, logical grouping 401 may include an electrical component 410 for selecting at least a portion of a screen of a first device for sharing with the one or more second devices based at least on the determined multimedia capabilities of the one or more second devices. In an aspect, for example, electrical component 410 may comprise content selection component 210.

Logical grouping 401 may include an electrical component 412 for computing application associated performance parameters by the first device, wherein the performance parameters are computed by the first device based at least on a type of content identified for sharing by the application on the first device and the determined multimedia capabilities of the one or more second devices. In an aspect, for example, electrical component 412 may comprise application performance component 212.

Logical grouping 401 may include an electrical component 414 for transmitting the selected portion of the screen of the first device to the one or more second devices over the wireless connection. For example, in an aspect, electrical component 414 may comprise content transmitting content 214.

Additionally, system 400 may include a memory 416 that retains instructions for executing functions associated with the electrical components 402, 404, 406, 408, 410, 412, and 414, and stores data used or obtained by the electrical components 402, 404, 406, 408, 410, 412, and 414. While shown as being external to memory 416 it is to be understood that one or more of the electrical components 402, 404, 406, 408, 410, 412, and 414 may exist within memory 416. In one example, electrical components 402, 404, 406, 408, 410, 412, and 414 may comprise at least one processor, or each electrical component 402, 404, 406, 408, 410, 412, and 414 may be a corresponding module of at least one processor. Moreover, in an additional or alternative example, electrical components 402, 404, 406, 408, 410, 412, and 414 may be a computer program product including a computer readable medium, where each electrical component 402, 404, 406, 408, 410, 412, and 414 may be corresponding code.

Figure 5:
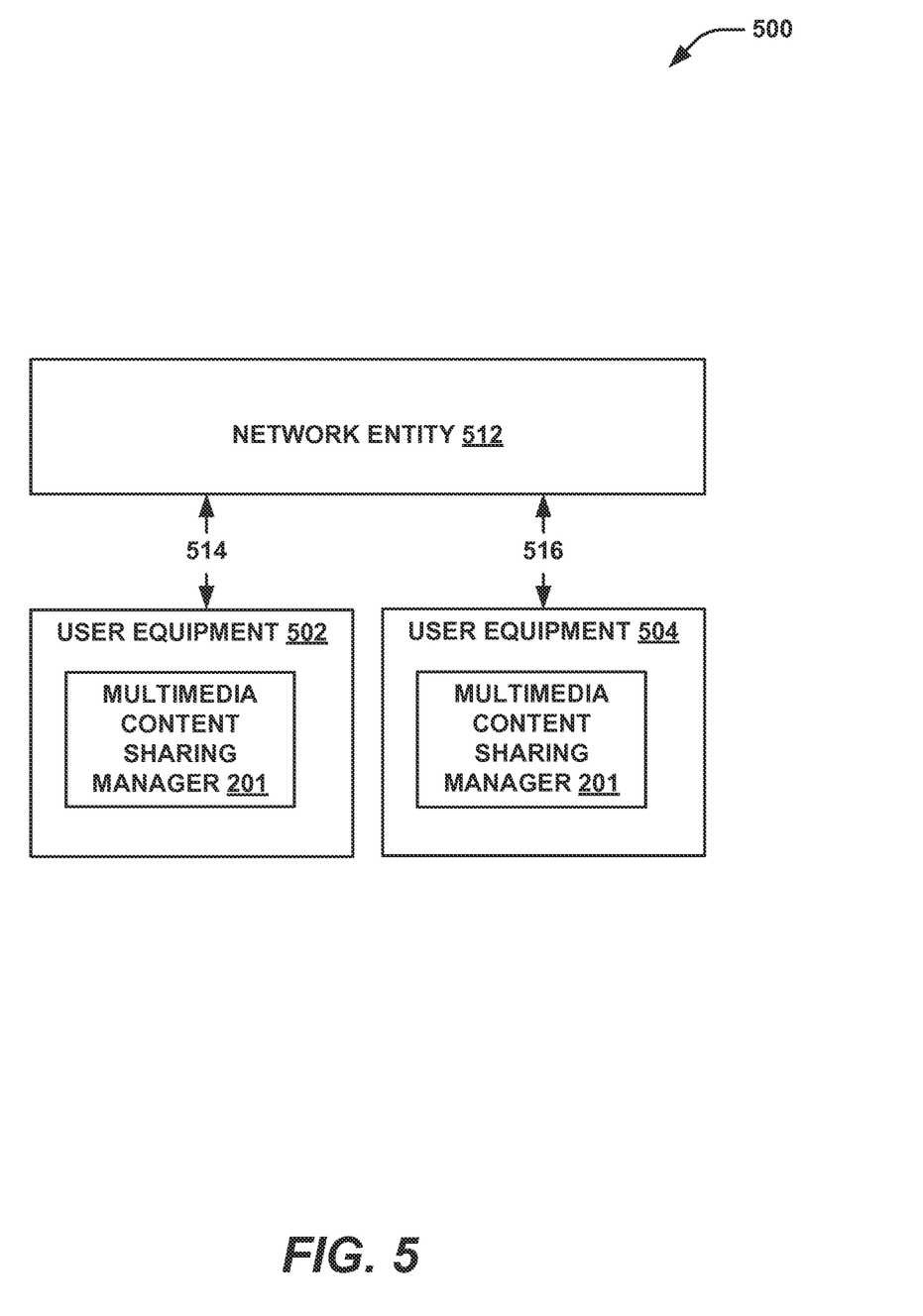
FIG. 5 is block diagram illustrating an example wireless system of aspects of the present disclosure.

Referring to FIG. 5, an example wireless communication system 500 is illustrated that facilitates sharing of multimedia content between wireless devices in real-time over a wireless connection.

In an aspect, for example, system 500 includes user equipments (UE) 502 and/or 504 that may communicate with one or more network entities 512, via one or more over-the-air links 514 and/or 516. In an aspect, for example, UE 502 may communicate with UE 504 via network entity 512 and/or via links 514 and/or 516 for sharing multimedia content between wireless devices, e.g., 502 and 504 via wireless connections 514 and/or 516. In an aspect, for example, UEs may be configured with multimedia content sharing manager 201 for sharing multimedia content between wireless devices 502 and 504 in real-time over wireless connections 514 and/or 516.

Figure 6:
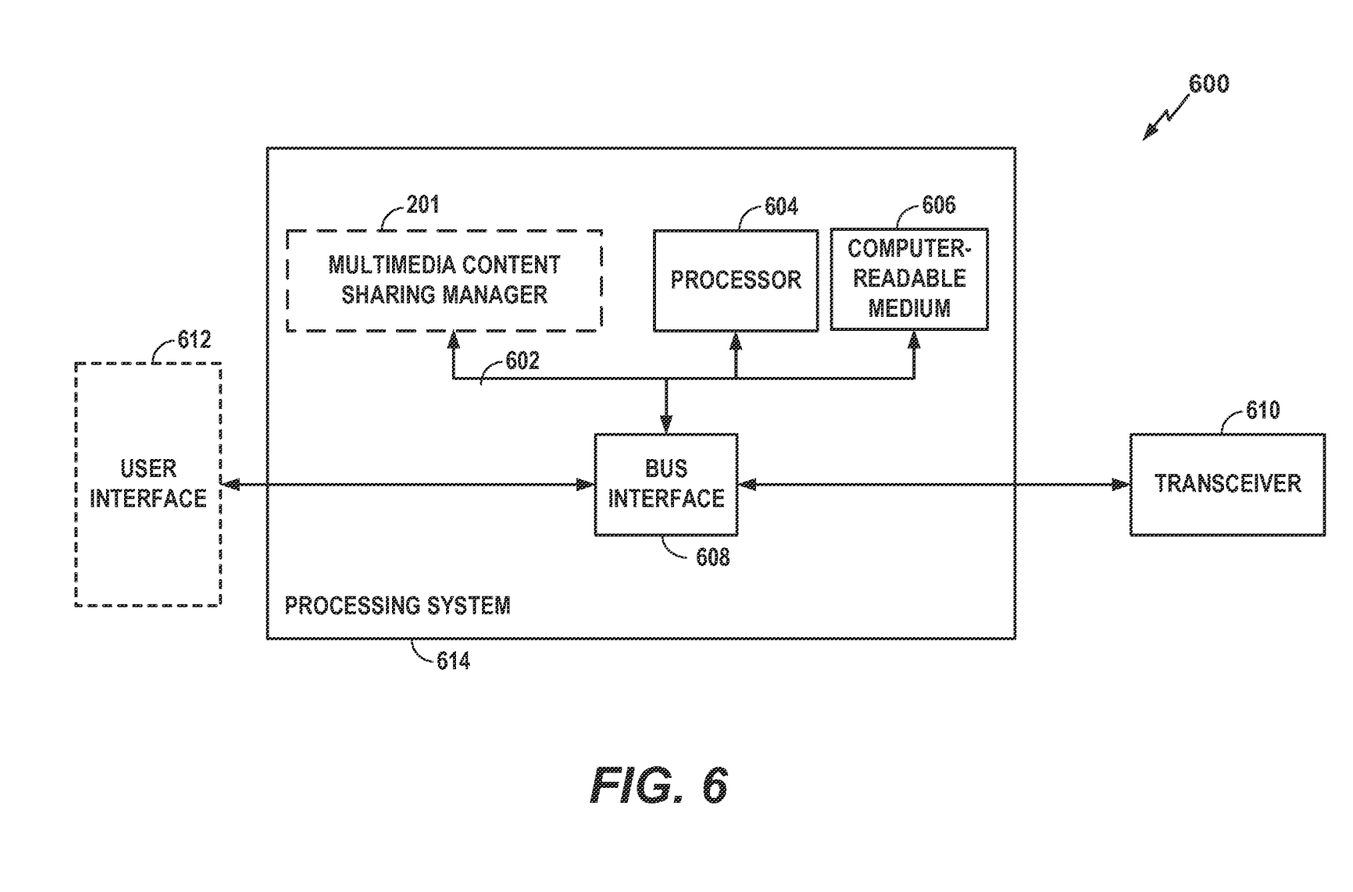
FIG. 6 is a block diagram illustrating an example of a hardware implementation for an apparatus employing a processing system.

FIG. 6 is a block diagram illustrating an example of a hardware implementation for an apparatus 600, for example, including multimedia content sharing manager 201 of FIG. 1, employing a processing system 614 for carrying out aspects of the present disclosure, such as method for sharing multimedia content between wireless devices in real-time over a wireless connection. In this example, the processing system 614 may be implemented with bus architecture, represented generally by a bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and one or more components described herein, such as, but not limited to, multimedia content sharing manager 201 and/or one or more of other components 202, 204, 206, 208, 210, 212, and/or 214 (FIG. 2). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software.

Figure 7:
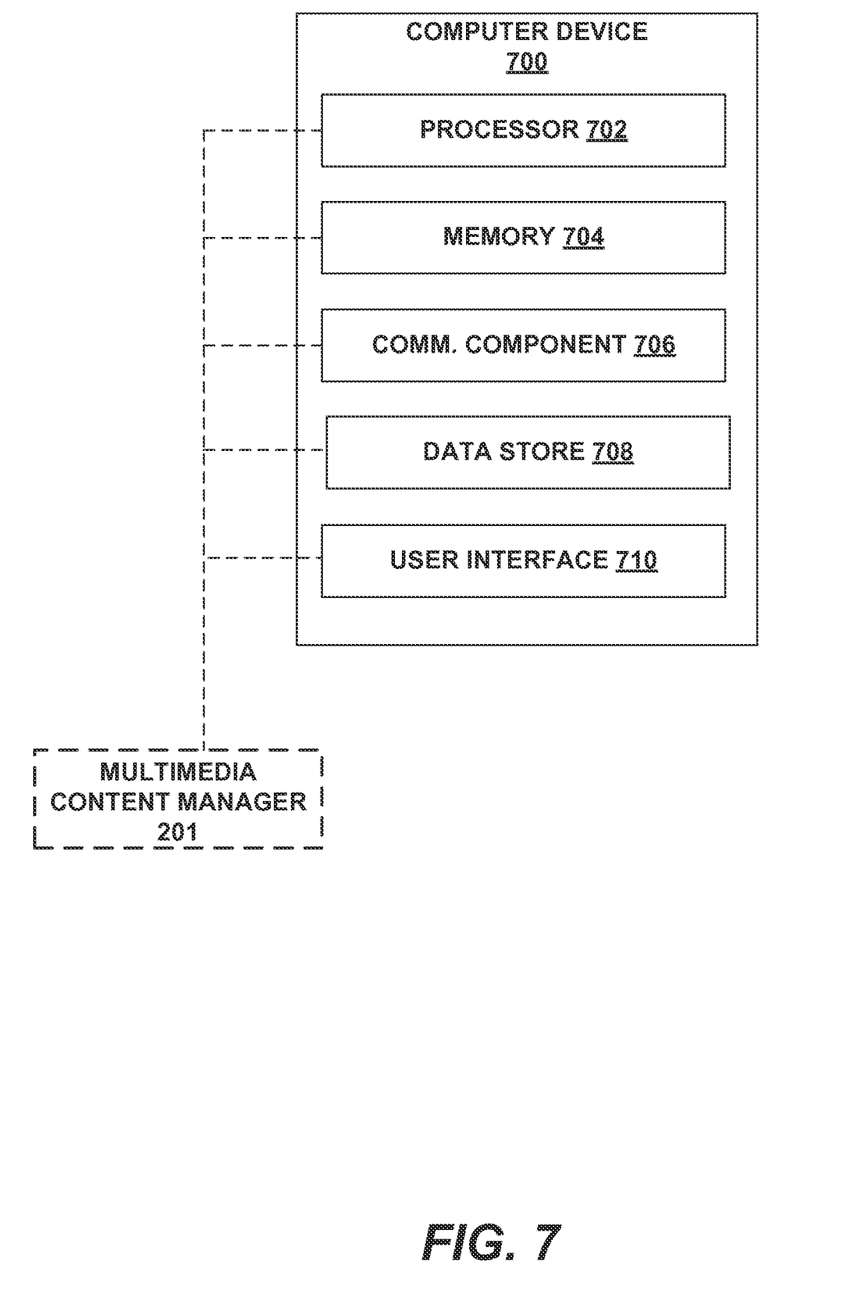
FIG. 7 is a block diagram of an aspect of a computer device of the present disclosure.

Referring to FIG. 7, in one aspect, multimedia content sharing manager 301 (FIG. 1) may be represented by a specially programmed or configured computer device 700. In one aspect of implementation, computer device 700 may include multimedia content sharing manager 201 and/or one or more of components 202, 204, 206, 208, 210, 212, and/or 214 (FIG. 2), such as in specially programmed computer readable instructions or code, firmware, hardware, or some combination thereof. Computer device 700 includes a processor 702 specially configured to carry out processing functions associated with one or more of components and functions described herein.

Processor 702 can include a single or multiple set of processors or multi-core processors. Moreover, processor 702 can be implemented as an integrated processing system and/or a distributed processing system. For example, processor 702 may be configured to execute the described functions of multimedia content sharing manager 201, application identifying component 202, a device discovering component 204, a communication protocol component 206, a multimedia capability determining component 208, a content selection component 210, an application performance component 212, and/or a content transmitting component 214.

Computer device 700 further includes a memory 704, such as for storing data used herein and/or local versions of applications and/or instructions or code being executed by processor 702, such as to perform the respective functions of the respective entities described herein. Memory 704 can include any type of memory usable by a computer, such as random access memory (RAM), read only memory (ROM), tapes, magnetic discs, optical discs, volatile memory, non-volatile memory, and any combination thereof. For example, memory 704 may be configured to multimedia content identified for sharing between the wireless devices as described above.

Further, computer device 700 includes a communications component 706 that provides for establishing and maintaining communications with one or more parties utilizing hardware, software, and services as described herein. Communications component 706 may carry communications between components on computer device 700, as well as between computer device 700 and external devices, such as devices located across a communications network and/or devices serially or locally connected to computer device 700. For example, communications component 706 may include one or more buses, and may further include transmit chain components and receive chain components associated with a transmitter and receiver, respectively, or a transceiver, operable for interfacing with external devices. For example, communications component 706 may be configured to perform the communications functions described herein of multimedia content sharing manager 301 and/or components of the multimedia content sharing manager.

Additionally, computer device 700 may further include a data store 708, which can be any suitable combination of hardware and/or software, that provides for mass storage of information, databases, and programs employed in connection with aspects described herein. For example, data store 708 may be a data repository for applications not currently being executed by processor 702. For example, data store 708 may be configured to store multimedia content identified for sharing between wireless devices in real-time over a wireless connection.

Computer device 700 may additionally include a user interface component 710 operable to receive inputs from a user of computer device 700, and further operable to generate outputs for presentation to the user. User interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof. For example, user interface component 710 may be configured to receive user input from multimedia content sharing manager 201 (e.g., images, registration information and associated information).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. A storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for sharing multimedia content between wireless devices in real-time over a wireless connection, comprising:
   identifying an application for sharing by a first device;
   discovering one or more second devices by the first device;
   applying communication protocols for communicating with the one or more second devices and creating an association between the first device and the one or more second devices;
   determining multimedia capabilities of the one or more second devices;
   selecting content being rendered on a portion of a screen of the first device for sharing with the one or more second devices based at least on the determined multimedia capabilities of the one or more second devices by receiving a selection of the portion of the screen of the first device;
   computing application associated performance parameters by the first device, wherein the application associated performance parameters are computed by the first device based at least on a type of content identified for sharing by the application on the first device and the determined multimedia capabilities of the one or more second devices, wherein the application associated performance parameters computed by the first device include quality of service (QoS) values for the one or more second devices; and
   transmitting the selected portion of the screen of the first device to the one or more second devices over the wireless connection.

2. The method of claim 1, wherein the one or more second devices comprise a thin client.

3. The method of claim 1, further comprising:
   configuring access privileges for the one or more second devices by the first device.

4. The method of claim 1, wherein the receiving comprises:
   receiving the selection of the portion of the screen to be shared based on a selection by a marking device, a pointing device or a touch gesture.

5. The method of claim 1, further comprising:
   dynamically updating the QoS values for the one or more second devices based on the type of content shared by the first device.

6. The method of claim 1, further comprising:
   configuring access privileges for the one or more second devices by the first device.

7. The method of claim 1, wherein the wireless connection is a wireless fidelity (Wi-Fi), cellular, or a Bluetooth connection.

8. The method of claim 1, further comprising:
   dynamically selecting the wireless connection based on available bandwidth.

9. The method of claim 1, further comprising:
   storing information associated with the one or more second devices in a database on the first device, wherein the stored information includes media access control (MAC) address of the one or more second devices.

10. An apparatus for sharing multimedia content between wireless devices in real-time over a wireless connection, comprising:
    means for identifying an application for sharing by a first device;
    means for discovering one or more second devices by the first device;
    means for applying communication protocols for communicating with the one or more second devices and creating an association between the first device and the one or more second devices;
    means for determining multimedia capabilities of the one or more second devices;
    means for selecting content being rendered on a portion of a screen of the first device for sharing with the one or more second devices based at least on the determined multimedia capabilities of the one or more second devices by receiving a selection of the portion of the screen of the first device;
    means for computing application associated performance parameters by the first device, wherein the application associated performance parameters are computed by the first device based at least on a type of content identified for sharing by the application on the first device and the determined multimedia capabilities of the one or more second devices, wherein the application associated performance parameters computed by the first device include quality of service (QoS) values for the one or more second devices; and
    means for transmitting the selected portion of the screen of the first device to the one or more second devices over the wireless connection.

11. The apparatus of claim 10, wherein the one or more second devices comprise a thin client.

12. The apparatus of claim 10, further comprising:
    means for configuring access privileges for the one or more second devices by the first device.

13. The apparatus of claim 10, wherein the means for receiving further comprises:
    means for receiving the selection of the portion of the screen to be shared based on a selection by a marking device, a pointing device or a touch gesture.

14. The apparatus of claim 10, further comprising:
    means for dynamically updating the QoS values for the one or more second devices based on the type of content shared by the first device.

15. The apparatus of claim 10, further comprising:
    means for configuring access privileges for the one or more second devices by the first device.

16. The apparatus of claim 10, wherein the wireless connection is a wireless fidelity (Wi-Fi), cellular, or a Bluetooth connection.

17. The apparatus of claim 10, further comprising:
    means for dynamically selecting the wireless connection based on available bandwidth.

18. The apparatus of claim 10, further comprising:
    means for storing information associated with the one or more second devices in a database on the first device, wherein the stored information includes media access control (MAC) address of the one or more second devices.

19. A non-transitory computer-readable medium for sharing multimedia content between wireless devices in real-time over a wireless connection, comprising:
at least one instruction for identifying an application for sharing by a first device;
at least one instruction for discovering one or more second devices by the first device;
at least one instruction for applying communication protocols for communicating with the one or more second devices and creating an association between the first device and the one or more second devices;
at least one instruction for determining multimedia capabilities of the one or more second devices;
at least one instruction for selecting content being rendered on a portion of a screen of the first device for sharing with the one or more second devices based at least on the determined multimedia capabilities of the one or more second devices by receiving a selection of the portion of the screen of the first device;
at least one instruction for computing application associated performance parameters by the first device, wherein the application associated performance parameters are computed by the first device based at least on a type of content identified for sharing by the application on the first device and the determined multimedia capabilities of the one or more second devices, wherein the application associated performance parameters computed by the first device include quality of service (QoS) values for the one or more second devices; and
at least one instruction for transmitting the selected portion of the screen of the first device to the one or more second devices over the wireless connection.

20. The non-transitory computer-readable medium of claim 19, wherein the one or more second devices comprise a thin client.

21. The non-transitory computer-readable medium of claim 19, further comprising:
at least one instruction for configuring access privileges for the one or more second devices by the first device.

22. The non-transitory computer-readable medium of claim 19, wherein the at least one instruction for receiving comprises:
at least one instruction for receiving the selection of the portion of the screen to be shared based on a selection by a marking device, a pointing device or a touch gesture.

23. The non-transitory computer-readable medium of claim 19, further comprising:
at least one instruction for dynamically updating the QoS values for the one or more second devices based on the type of content shared by the first device.

24. The non-transitory computer-readable medium of claim 19, further comprising:
at least one instruction for configuring access privileges for the one or more second devices by the first device.

25. The non-transitory computer-readable medium of claim 19, wherein the wireless connection is a wireless fidelity (Wi-Fi), cellular, or a Bluetooth connection.

26. The non-transitory computer-readable medium of claim 19, further comprising:
at least one instruction for dynamically selecting the wireless connection based on available bandwidth.

27. The non-transitory computer-readable medium of claim 19, further comprising:
at least one instruction for storing information associated with the one or more second devices in a database on the first device, wherein the stored information includes media access control (MAC) address of the one or more second devices.

28. An apparatus for sharing multimedia content between wireless devices in real-time over a wireless connection, comprising:
an application identifying component configured to identify an application for sharing by a first device;
a device discovering component configured to discover one or more second devices by the first device;
a communication protocol component configured to apply communication protocols for communicating with the one or more second devices and creating an association between the first device and the one or more second devices;
a multimedia capability determining component configured to determine multimedia capabilities of the one or more second devices;
a content selection component configured to select content being rendered on a portion of a screen of the first device for sharing with the one or more second devices based at least on the determined multimedia capabilities of the one or more second devices by receiving a selection of the portion of the screen of the first device;
an application performance component configured to compute application associated performance parameters by the first device, wherein the application associated performance parameters are computed by the first device based at least on a type of content identified for sharing by the application on the first device and the determined multimedia capabilities of the one or more second devices, wherein the application associated performance parameters computed by the first device include quality of service (QoS) values for the one or more second devices; and
a content transmitting component configured to transmit the selected portion of the screen of the first device to the one or more second devices over the wireless connection.

29. The apparatus of claim 28, wherein the one or more second devices comprise a thin client.

30. The apparatus of claim 28, wherein the apparatus is further configured to configure access privileges for the one or more second devices by the first device.

31. The apparatus of claim 28, wherein the content selection component being configured to select comprises the content selection component being configured to receive the selection of the portion of the screen to be shared based on a selection by a marking device, a pointing device or a touch gesture.

32. The apparatus of claim 28, wherein the apparatus is further configured to dynamically update the QoS values for the one or more second devices based on the type of content shared by the first device.

33. The apparatus of claim 28, wherein the apparatus is further configured to configure access privileges for the one or more second devices by the first device.

34. The apparatus of claim 28, wherein the wireless connection is a wireless fidelity (Wi-Fi), cellular, or a Bluetooth connection.

35. The apparatus of claim 28, wherein the apparatus is further configured to dynamically select the wireless connection based on available bandwidth.

36. The apparatus of claim 28, wherein the apparatus is further configured to store information associated with the one or more second devices in a database on the first device, wherein the stored information includes media access control (MAC) address of the one or more second devices.

37. The method of claim 1, wherein the discovering of the one or more second devices by the first device is independent of a technology or a platform of the one or more second devices.

38. The apparatus of claim 10, wherein the discovering of the one or more second devices by the first device is independent of a technology or a platform of the one or more second devices.

39. The non-transitory computer-readable medium of claim 19, wherein the discovering of the one or more second devices by the first device is independent of a technology or a platform of the one or more second devices.

40. The apparatus of claim 28, wherein the discovering of the one or more second devices by the first device is independent of a technology or a platform of the one or more second devices.

* * * * *